United States Patent
Parashar

(10) Patent No.: US 9,871,753 B2
(45) Date of Patent: Jan. 16, 2018

(54) METHOD, DEVICE AND SYSTEM FOR DISTINCT FORWARDING OF A PLURALITY OF MESSAGES SELECTED AS A GROUP

(71) Applicant: BLACKBERRY LIMITED, Waterloo (CA)

(72) Inventor: Tushar Parashar, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 331 days.

(21) Appl. No.: 14/681,822

(22) Filed: Apr. 8, 2015

(65) Prior Publication Data

US 2016/0301643 A1 Oct. 13, 2016

(51) Int. Cl.
*H04L 12/58* (2006.01)
*G06Q 10/10* (2012.01)

(52) U.S. Cl.
CPC ........... *H04L 51/14* (2013.01); *G06Q 10/107* (2013.01); *H04L 51/02* (2013.01); *H04L 51/32* (2013.01); *H04L 51/38* (2013.01)

(58) Field of Classification Search
CPC ......... H04L 51/26; H04L 51/32; H04L 51/08; H04L 51/22; H04L 51/00; H04L 51/28
See application file for complete search history.

(56) References Cited

U.S. PATENT DOCUMENTS

| | | | |
|---|---|---|---|
| 2007/0078935 A1 | 4/2007 | Garcia-Martin et al. | |
| 2007/0106736 A1* | 5/2007 | Shepherd | G06Q 10/107 709/206 |
| 2008/0182601 A1* | 7/2008 | Cho | H04L 51/38 455/466 |
| 2011/0265016 A1* | 10/2011 | Koopman | G06Q 10/107 715/752 |

(Continued)

FOREIGN PATENT DOCUMENTS

| | | |
|---|---|---|
| EP | 1669884 A1 | 6/2006 |
| EP | 2767941 A1 | 8/2014 |
| WO | WO-200135258 A2 | 5/2001 |

OTHER PUBLICATIONS https://social.technet.microsoft.com/Forums/exchange/en-US/03cb38c1-42a8-4f4a-b460-880e4a4b4953/smartreply-feature?forum=exchangesvrmobilitylegacy—Jun. 28, 2011.

(Continued)

*Primary Examiner* — Barbara B Anyan
(74) *Attorney, Agent, or Firm* — Perry + Currier Inc.

(57) ABSTRACT

A method, device and system for distinct forwarding of a plurality of messages selected as a group is provided. The device comprises: a processor, a memory, a communication interface, an input device and a display device, the processor configured to: render, at the display device, a message list comprising messages associated with the device; receive, using the input device, a selection of a plurality of the messages in the message list, and thereafter a single indi- (Continued)

cation to forward all of the plurality of the messages in the selection to a given network address; and, transmit, using the communication interface, to the given network address, a plurality of distinct forwarding messages, each respectively comprising at least a portion of one of the plurality of the messages in the selection, the plurality of distinct forwarding messages in a one-to-one relationship with the plurality of the messages in the selection.

20 Claims, 10 Drawing Sheets

(56) References Cited

U.S. PATENT DOCUMENTS

2016/0014053 A1* 1/2016 Celia ............. H04L 51/02
715/752

OTHER PUBLICATIONS https://supportforums.blackberry.com/t5/BlackBerry-Enterprise-Service-10/Actiyesync-feature-SmartForward-SmartReply-not-supported-working/td-p/2347247—May 2, 2013.
http://support.divide.com/hc/en-us/articles/201962450-Smart-Forward-Reply—Apr. 24, 2014.
http://email.about.com/od/outlooktips/qt/et_forward_fold.htm—Mar. 2, 2015.
http://webapps.stackexchange.com/questions/148/how-to-forward-multiple-emails-in-gmail—Mar. 2, 2015.
Extended European Search Report dated Sep. 15, 2016 for EP Patent Application No. 15199677.4.

* cited by examiner

METHOD, DEVICE AND SYSTEM FOR DISTINCT FORWARDING OF A PLURALITY OF MESSAGES SELECTED AS A GROUP

FIELD

The specification relates generally to messages and specifically to a method, device and system for distinct forwarding of a plurality of messages selected as a group.

BACKGROUND

The evolution of messaging in computers is currently quite active. However forwarding of multiple messages at once is cumbersome as generally the multiple messages being forwarded are stacked as attachments to a single forwarded message.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
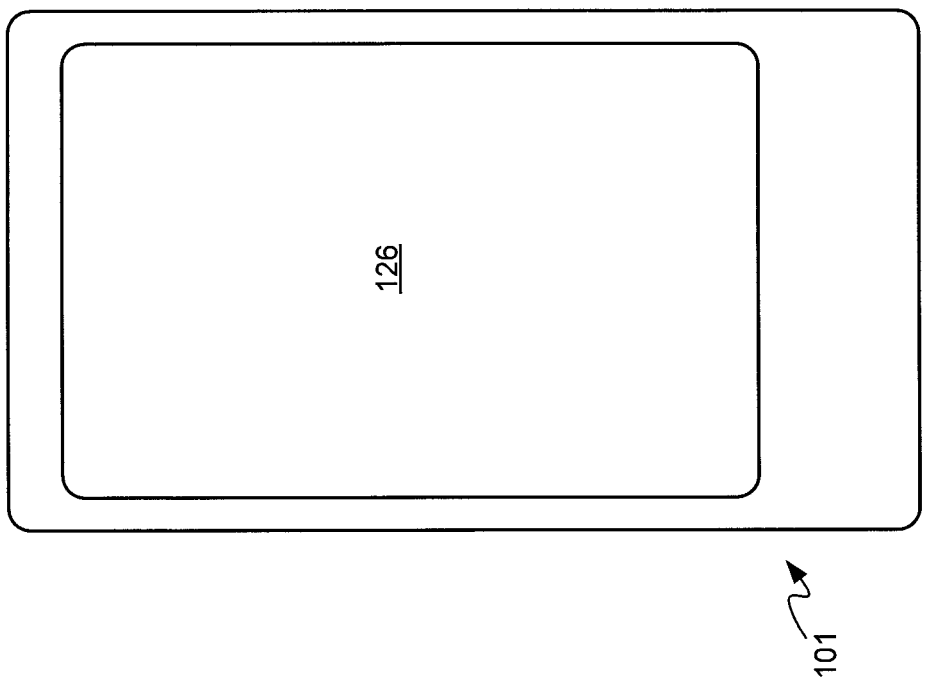
FIG. 1 depicts a device configured for distinct forwarding of a plurality of messages, according to non-limiting implementations.

In general, this disclosure is directed to a device, including, but not limited to a mobile device, which forwards a selected plurality of messages one-by-one as a plurality of distinct forwarding messages in a queue, in a one-to-one relationship with the selected messages. For example, a plurality of messages is selected as a group, but then forwarded individually. The forwarding messages can be used for data migration and the like.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a device comprising: a processor, a memory, a communication interface, an input device and a display device, the processor configured to: render, at the display device, a message list comprising messages associated with the device; receive, using the input device, a selection of a plurality of the messages in the message list, and thereafter a single indication to forward all of the plurality of the messages in the selection to a given network address; and, transmit, using the communication interface, to the given network address, a plurality of distinct forwarding messages, each respectively comprising at least a portion of one of the plurality of the messages in the selection, the plurality of distinct forwarding messages in a one-to-one relationship with the plurality of the messages in the selection.

The processor can be further configured to render, at the display device, in a plurality of fields of the message list, indications of each the plurality of distinct forwarding messages as the plurality of distinct forwarding messages are being transmitted, each of the plurality of fields dedicated to a single respective distinct forwarding message of the plurality of distinct forwarding messages.

Each of the plurality of fields can further comprise a status of a respective distinct forwarding message.

The processor can be further configured to independently change respective statuses of each of the plurality of distinct forwarding messages in the message list as each of the respective statuses changes.

The processor can be further configured to associate a respective forward token with each of the plurality of distinct forwarding messages in a one-to-one relationship.

The processor can be further configured to render, at the display device, an intermediate forwarding message, the given network address received in the intermediate forwarding message, the intermediate forwarding message discarded in conjunction with transmitting the plurality of distinct forwarding messages.

The processor can be further configured to include, in the intermediate forwarding message an indication of one or more of: the plurality of distinct forwarding messages; a number of the plurality of distinct forwarding messages; and forward tokens for each of the plurality of distinct forwarding messages.

The intermediate forwarding message can be absent a subject field.

When a plurality of the messages are stored at a server, the plurality of distinct forwarding messages can be transmitted to the server and each of the plurality of distinct forwarding messages can be configured to cause the server to forward the plurality of the messages stored at server to the given network address as a plurality of distinct forwarded messages.

Attachments to the plurality of the messages can be absent the plurality of distinct forwarding messages when the plurality of the messages are stored at the server.

Another aspect of the specification provides a method comprising: at a device comprising, a processor, a memory, a communication interface, an input device and a display device, render, at the display device, a message list comprising messages associated with the device; receiving, using the input device, a selection of a plurality of the messages in the message list, and thereafter a single indication to forward all of the plurality of the messages in the selection to a given network address; and, transmitting, using the communication interface, to the given network address, a plurality of distinct forwarding messages, each respectively comprising at least a portion of one of the plurality of the messages in the selection, the plurality of distinct forwarding messages in a one-to-one relationship with the plurality of the messages in the selection.

The method can further comprise rendering, at the display device, in a plurality of fields of the message list, indications of each the plurality of distinct forwarding messages as the plurality of distinct forwarding messages are being transmitted, each of the plurality of fields dedicated to a single respective distinct forwarding message of the plurality of distinct forwarding messages.

Each of the plurality of fields can further comprise a status of a respective distinct forwarding message.

The method can further comprise independently changing respective statuses of each of the plurality of distinct forwarding messages in the message list as each of the respective statuses changes.

The method can further comprise associating a respective forward token with each of the plurality of distinct forwarding messages in a one-to-one relationship.

The method can further comprise rendering, at the display device, an intermediate forwarding message, the given network address received in the intermediate forwarding message, the intermediate forwarding message discarded in conjunction with transmitting the plurality of distinct forwarding messages.

The method can further comprise including, in the intermediate forwarding message an indication of one or more of: the plurality of distinct forwarding messages; a number of the plurality of distinct forwarding messages; and forward tokens for each of the plurality of distinct forwarding messages.

The intermediate forwarding message can be absent a subject field.

When a plurality of the messages are stored at a server, the plurality of distinct forwarding messages can be transmitted to the server and each of the plurality of distinct forwarding messages can be configured to cause the server to forward the plurality of the messages stored at server to the given network address as a plurality of distinct forwarded messages.

Attachments to the plurality of the messages can be absent the plurality of distinct forwarding messages when the plurality of the messages are stored at the server.

Another aspect of the specification provides a computer-readable medium storing a computer program, wherein execution of the computer program is for: at a device comprising, a processor, a memory, a communication interface, an input device and a display device, render, at the display device, a message list comprising messages associated with the device; receiving, using the input device, a selection of a plurality of the messages in the message list, and thereafter a single indication to forward all of the plurality of the messages in the selection to a given network address; and, transmitting, using the communication interface, to the given network address, a plurality of distinct forwarding messages, each respectively comprising at least a portion of one of the plurality of the messages in the selection, the plurality of distinct forwarding messages in a one-to-one relationship with the plurality of the messages in the selection.

Figure 2:
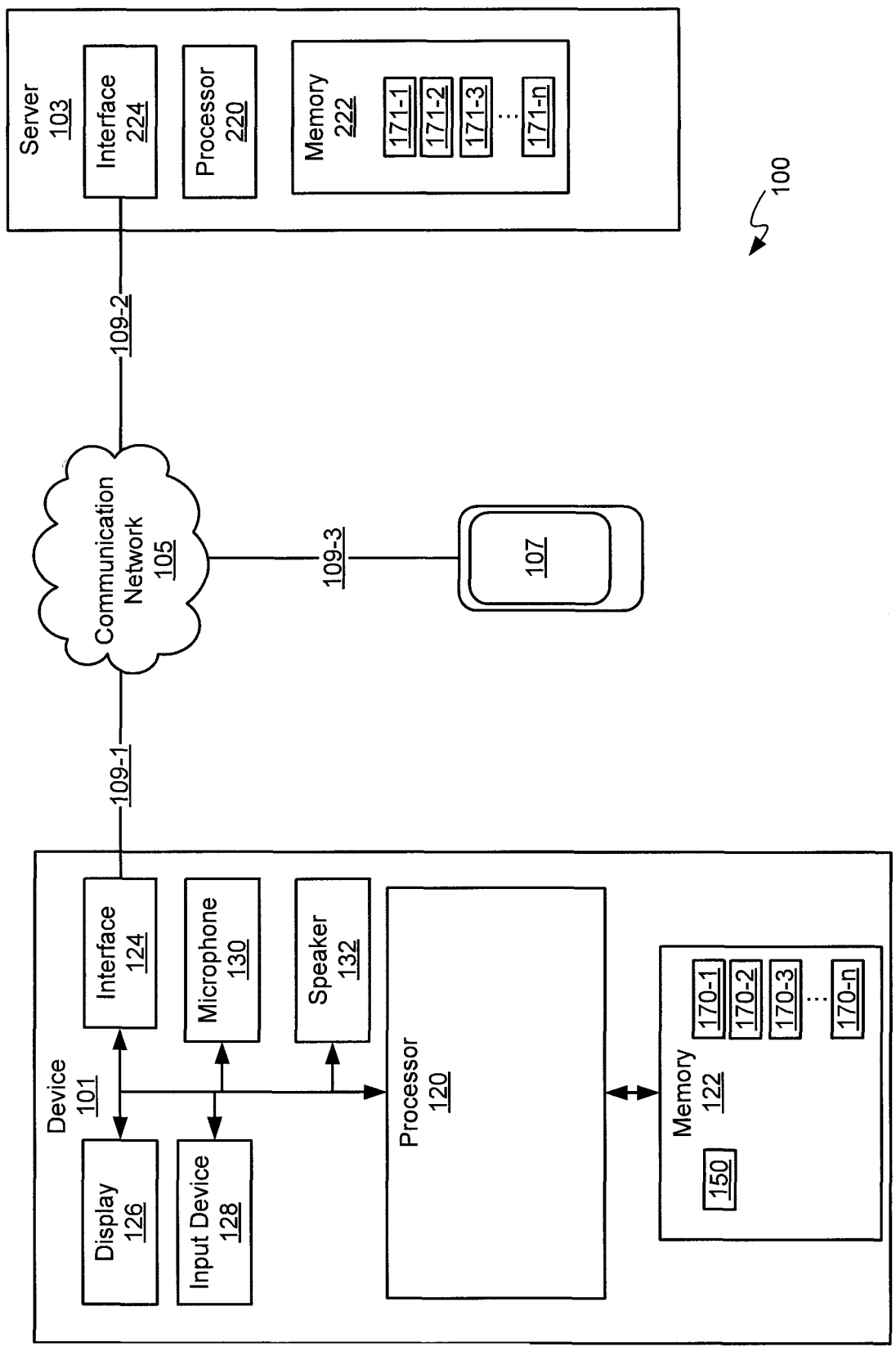
FIG. 2 depicts a schematic block diagram of a system configured for distinct forwarding of a plurality of messages that includes the device of FIG. 1, according to non-limiting implementations.

FIG. 1 depicts a front perspective view of a mobile electronic device 101 (referred to interchangeably hereafter as device 101) configured for distinct forwarding of messages, according to non-limiting implementations; FIG. 2 depicts a system 100 which includes device 101, a server 103, a communication network 105 (referred to interchangeably hereafter as network 105) and a remote device 107 (i.e. remote from device 101). Devices 101, 107 and server 103 are configured to communicate with each other using network 105 and respective links 109-1, 109-2, 109-3, according to non-limiting implementations. Links 109-1, 109-2, 109-3 will be interchangeably referred to hereafter, collectively, as links 109, and generically as a link 109.

Also depicted are schematic block diagrams of each of device 101 and server 103 according to non-limiting implementations, as described hereafter.

Device 101 comprises a processor 120, a memory 122, a communication interface 124, an input device 128 and a display device 126, processor 120 configured to: render, at display device 126, a message list comprising messages associated with device 101; receive, using input device 128, a selection of a plurality of the messages in the message list, and thereafter a single indication to forward all of the plurality of the messages in the selection to a given network address; and, transmit, using communication interface 124, to the given network address, a plurality of distinct forwarding messages in a queue, each respectively comprising at least a portion of one of the plurality of the messages in the selection, the plurality of distinct forwarding messages in a one-to-one relationship with the plurality of the messages in the selection. Device 101, as depicted, comprises an optional microphone 130 and an optional speaker 132. Messages that are forwarded can include, but are not limited to, email messages, SMS (short message service) messages, MMS (multimedia messaging service) messages, text messages, calendar invitations and the like.

Server 103 generally comprises a processor 220, a memory 222 and a communication interface 224. Server 103 and/or processor 220 is generally configured to receive the plurality of distinct forwarding messages in a queue and transmit the plurality of distinct forwarding messages in a queue to device 107.

Network 105 can comprise any suitable combination of: wired networks, wireless networks, cell-phone networks, cellular networks (including but not limited to 2G, 2.5G, 3G, 4G+, and the like), Bluetooth networks, NFC (near field communication) networks, WiFi networks, WiMax networks, packet based networks, the Internet, analog networks, the PSTN (public switched telephone network), WiFi access points, and the like, and/or a combination.

Device 107 can be similar to, or different from device 101. Furthermore, while only one device 101 and one device 107 are depicted in system 100, system 100 can comprise more than one device similar to device 107 and/or similar to device 101, including hundreds to millions of devices.

Links 109 comprises any suitable links for enabling devices 101, 107 and server 103 to communicate using network 105. Links 109 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), WiFi access points, and the like, and/or a combination.

Device 101 will now be described in further detail. Device 101 can be any type of electronic device that can be used in a self-contained manner. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

It should be emphasized that the structure of device 101 in FIG. 2 is purely an example, and contemplates a device that can be used for both wireless voice (e.g. telephony) and wireless data communications (e.g. email, web browsing, text, and the like). However, while FIG. 2 contemplates a device that can be used for telephony and/or messaging, in other implementations, device 101 can comprise a device configured for implementing any suitable specialized functions, including but not limited to one or more of telephony, messaging, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. In specific non-limiting implementations described herein, input device 128 comprises a touch screen for receiving touch input data.

Input from input device 128 is received at processor 120 (which can be implemented as a plurality of processors, including but not limited to one or more central processors (CPUs) and/or one or more processing units; either way, processor 120 comprises a hardware element and/or a hardware processor of device 101). Processor 120 is configured to communicate with memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module and/or a non-volatile memory.

In particular, memory 122 stores an application 150 that, when processed by processor 120, enables processor 120 to: render, at display device 126, a message list comprising messages associated with device 101; receive, using input device 128, a selection of a plurality of the messages in the message list, and thereafter a single indication to forward all of the plurality of the messages in the selection to a given network address; and, transmit, using communication interface 124, to the given network address, a plurality of distinct forwarding messages in a queue, each respectively comprising at least a portion of one of the plurality of the messages in the selection, the plurality of distinct forwarding messages in a one-to-one relationship with the plurality of the messages in the selection.

Memory 122 further stores messages and/or indications of messages 170-1, 170-2, 170-3 . . . -170-n, will be interchangeably referred to hereafter, collectively, as messages 170, and generically as a message 170. Each message 170 can comprise at least a portion of a message associated with device 101. For example, device 101 can receive a message 170 from server 103, which can receive and store corresponding messages 171-1, 171-2, 171-3 . . . -171-n, (will be interchangeably referred to hereafter, collectively, as messages 171, and generically as a message 171), as well transmit messages 170 to device 101. Indeed, each message 170 can comprise a subset of a respective message 171, with messages 170, 171 being in a one-to-one relationship; in a non-limiting example, each message 170 can comprise meta-data and text of a corresponding message 171, as well as an indication of associated attachments, but not the attachments themselves; similarly, each message 170 can comprise an indication of associated graphics, but not the graphics themselves. Rather, associated graphics and/or attachments can be requested from server 103 by device 101 upon selection and/or activation of an associated indication. Alternatively, each message 170 can comprise the entirety of a corresponding message 171.

Messages 170, 171 can include, but are not limited to, email messages, SMS (short message service) messages, MMS (multimedia messaging service) messages, text messages, calendar invitations and the like. In some implementations, messages can include, but are not limited to: notes and/or note date, tasks and/or task data and contacts and/or contact data; such notes and/or note date, tasks and/or task data and contacts and/or contact data can be included as attachments to messages in a message list.

Processor 120 can also be configured to communicate with a display device 126, and optionally a microphone 130 and a speaker 132. Display device 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display device 126 comprises a touch screen, display device 126 and input device 128 can be combined into one apparatus. Microphone 130 comprises any suitable microphone for receiving sound data. Speaker 132 comprises any suitable speaker for providing sound data, audible alerts, audible communications from remote devices, and the like, at device 101.

In some implementations, input device 128 and display device 126 are external to device 101, with processor 120 in communication with each of input device 128 and display device 126 via a suitable connection and/or link.

Processor 120 also connects to interface 124, which can be implemented as one or more radios and/or connectors and/or network adaptors and/or antennas, configured to communicate with network 105 via link 109-1. In general, interface 124 is configured to correspond with the network architecture that is used to implement link 109-1, as described above. In other implementations a plurality of links with different protocols can be employed and thus interface 124 can comprise a plurality of interfaces to support each link. Regardless, interface 124 is configured to establish a roaming data connection with network 105 using one or more links 109. Indeed, any suitable combination of interfaces is within the scope of present implementations.

While not depicted, device 101 further comprises a power source, for example a connection to a battery, a power pack and the like and/or a connection to a main power supply and a power adaptor (e.g. and AC-to-DC (alternating current to direct current) adaptor, and the like), which can be used to power device 101 and/or charge a battery and the like.

Further, it should be understood that in general a wide variety of configurations for device 101 are contemplated.

Device 107 generally comprises a device that can be similar to, or different from, device 101, but either way generally comprises at least a processor, memory and communication interface respectively similar to processor 120, memory 122 and interface 124, device 107 configured to communicate with device 101 and server 103 via link 109-3 and network 105.

Server 103 generally comprises one or more servers configured to manage messages 170, 171 on behalf of device 101, as well as communicate with devices 101, 107 via link 109-2 and network 105. Server 103 can be based on any well-known server environment including a module that houses one or more central processing units, volatile memory (e.g. random access memory), persistent memory (e.g. hard disk devices) and network interfaces to allow server 103 to communicate over link 109-2. For example, server 103 can comprise a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 103 are contemplated. For example, server 103 can comprise a computing device, including but not limited to one or more of a personal computer, a laptop computer, and a mobile computing device, configured to manage messages 170, 171 using network 105 and links 109.

In particular, server 103 can be configured to receive messages 171, for example from device 107 and/or other similar devices, store messages 171, and generate and transmit messages 170 to device 101, as well as forward messages received from device 101 on behalf of device 101.

Figure 3:
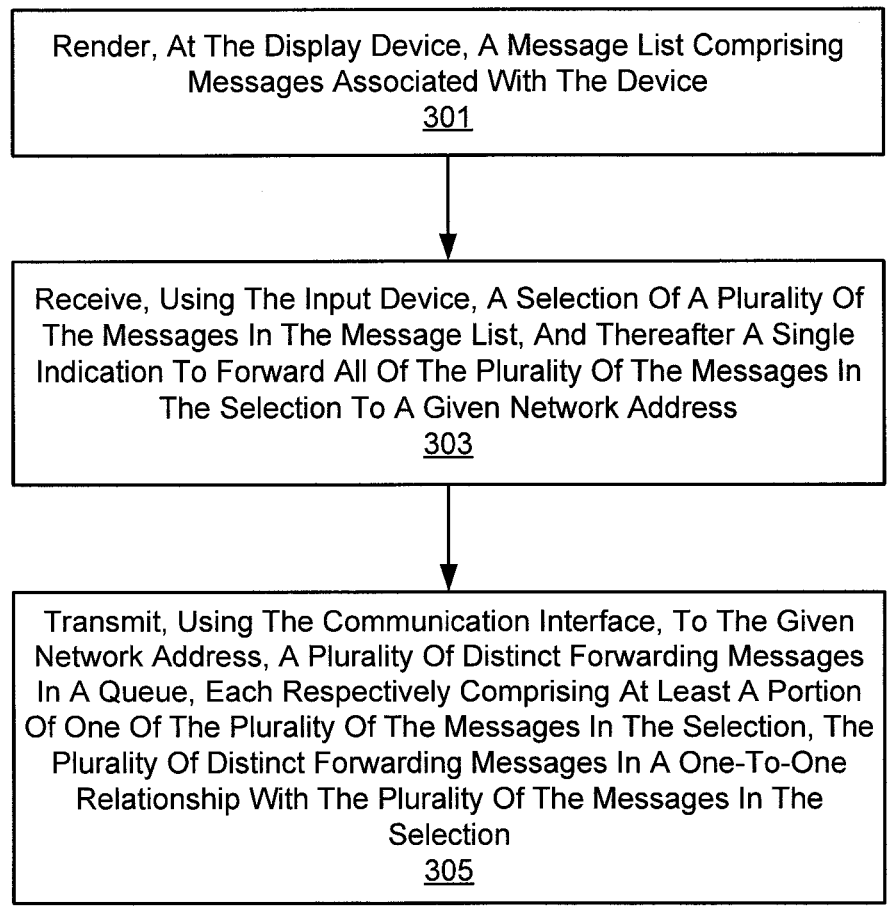
FIG. 3 depicts a method for distinct forwarding of a plurality of messages, according to non-limiting implementations.

Attention is now directed to FIG. 3 which depicts a flowchart of a method 300 for distinct forwarding of a plurality of messages, according to non-limiting implementations. In order to assist in the explanation of method 300, it will be assumed that method 300 is performed using system 100, and specifically by processor 120 of device 101, for example when processor 120 processes application 150. Indeed, method 300 is one way in which device 101 can be configured. Furthermore, the following discussion of method 300 will lead to a further understanding of device 101, and system 100 and its various components. However, it is to be understood that system 100 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well.

At block 301, processor 120 renders, at display device 126, a message list comprising messages 170 associated with device 101.

At block 303, processor 120 receive, using input device 128, a selection of a plurality of messages 170 in the message list, and thereafter a single indication to forward all of the plurality of messages 170 in the selection to a given network address, including, but not limited to, a network address of device 107.

At block 305, processor 120 transmits, using the communication interface 124, to the given network address, a plurality of distinct forwarding messages in a queue, each respectively comprising at least a portion of one of the plurality of messages 170 in the selection, the plurality of distinct forwarding messages in a one-to-one relationship with the plurality of messages 170 in the selection.

Method 300 will now be discussed with reference to FIGS. 4 to 10, with each of FIGS. 4 to 7 being substantially similar to FIG. 1, with like elements having like numbers, and FIGS. 8 and 10 being substantially similar to FIG. 2, with like elements having like numbers.

In particular, FIGS. 4 to 8 depict a front perspective view of device 101, including display device 126, and various graphic user interfaces (GUIs) rendered at display device 126 under control of processor 120.

Figure 4:
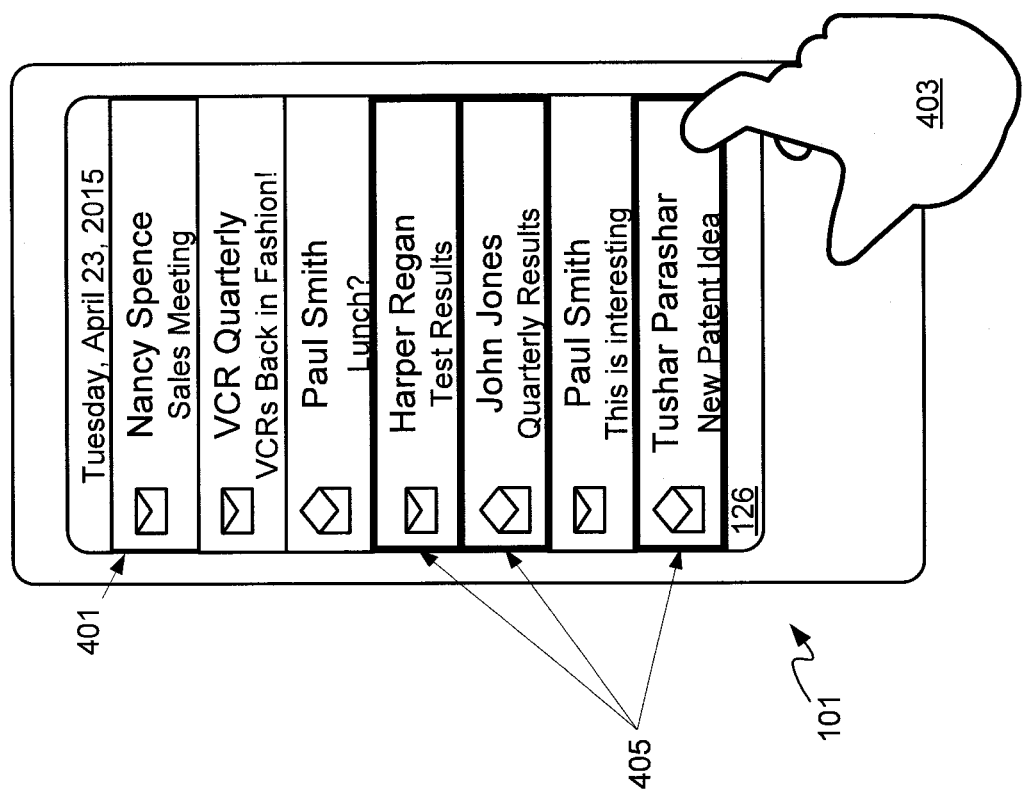
FIG. 4 depicts a message list rendered at the device of FIG. 1, as well as selection of messages in the message list, according to non-limiting implementations.

Attention is next directed to FIG. 4 which depicts a list 401 of messages associated with device 101, including messages 170, rendered at display device 126 (e.g. block 301 of method 300). In FIG. 4 it is assumed that input was received causing processor 120 to process a messaging application, which can be part of application 150, so that list 401 of messages are rendered at display device 126. List 401 includes messages 170, with each field in list 401 associated with a different message 170, with an identifier of one or more of a sending device, a sending account, and a user associated with a sending device and/or a sending account on a first line, and a subject on a second line and/or subject line. Each field in list 401 further comprises a respective icon showing whether an associated message has been marked as opened (an open envelope icon) or unopened (a closed envelope icon). Furthermore, while list 401, as depicted, shows only received messages, list 401 can also show transmitted messages, as described below with respect to FIG. 7.

In addition, other formats of list 401 are within the scope of present implementations; for example, list 401 need not be arranged in rows, and each message in list 401 can be indicated using any suitable combination of data, including, but not limited to, a time a message was received, or transmitted, and the like.

Furthermore, while list 401, as depicted, is specifically directed towards email messages, list 401 can include other types of messages including, but not limited to SMS (short message service) messages, MMS (multimedia messaging service) messages, text messages, calendar invitations and the like.

It is assumed in FIG. 4 that display device 126 includes a touchscreen display and that input device 128 includes the touchscreen display, though, as depicted, input device 128 also includes a button, a touchpad and the like. Hence, FIG. 4 further depicts a hand 403 of a user interacting with the touchscreen; in particular, through such interaction with the touchscreen, processor 120 receives a selection 405 of a plurality of the messages in the message list 401, for example messages from "Harper Regan", "John Jones" and "Tushar Parashar", each of which corresponds to one of messages 170. Selection 405 is indicated by associated lines of selected in list 401 being of a heavier weight than lines of unselected messages, however such selections can be indicated in other suitable ways, included, but not limited to, changes in colour, font, and the like of selected messages and/or through the use of selected message icons. Hence, a subset of messages 170 are selected in a group using selection 405.

While not depicted, one or more of the messages 170 in selection 405 are absent attachments, graphics, and/or any additional data that was not received from server 103 to save bandwidth. However, in other implementations, associated attachments, graphics and/or additional data can be downloaded from server 103 and stored at memory 122 in association with each message 170 and/or in each message 170.

Figure 5:
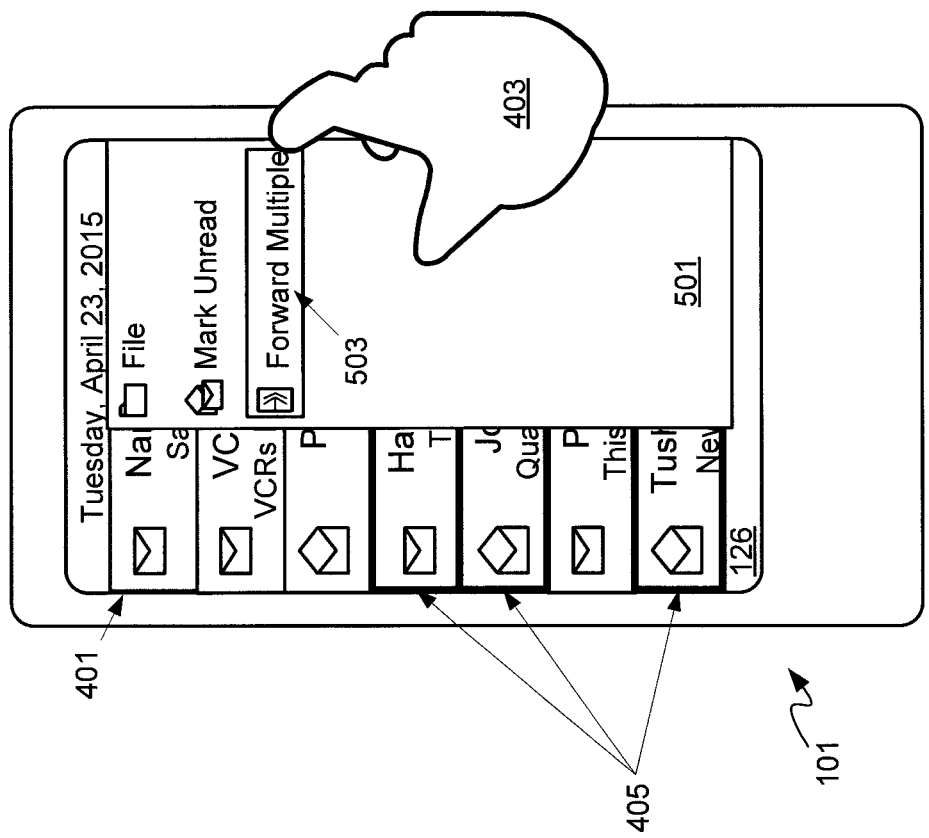
FIG. 5 depicts a menu for selecting single indication to forward all of the plurality of the messages in the selection to a given network address, according to non-limiting implementations.

Attention is next directed to FIG. 5 which is substantially similar to FIG. 4, with like elements having like numbers, but with a pull-out menu 501 depicted on list 401. In other words, while not depicted, processor 120 has received input, for example via hand 403 interaction with the touchscreen display in conjunction with selection 405, to cause processor 120 to control display device 126 to render menu 501.

As depicted three messages 170 are depicted in selection 405, however, as few as two messages 170 could be selected, as long as a plurality of messages 170 are in selection 405. Indeed, selection 405 can include all of the plurality of messages 170.

As depicted, menu includes various selectable options including an option to "File" selected messages, an option "Mark Unread" to mark selected as unread (i.e. thereby causing the icons that are open envelopes to change to closed envelopes), and a selectable option 503 to "Forward Multiple" selected messages. As depicted option 503 has been selected as indicated by the box around option 503, thought other processes for indicating selection of option 503 are within the scope of present implementations.

In any event, selection 405 and selection of option 503 can correspond to block 303 of method 300, where selection of option 503 can correspond to receiving a single indication to forward all of the plurality of the messages in the selection to a given network address.

In implementations where selection 405 has not occurred prior to option 503 being selected, selection 405 can be received thereafter; in other words, the process described with regards to FIGS. 4 and 5 can be reversed.

Figure 6:
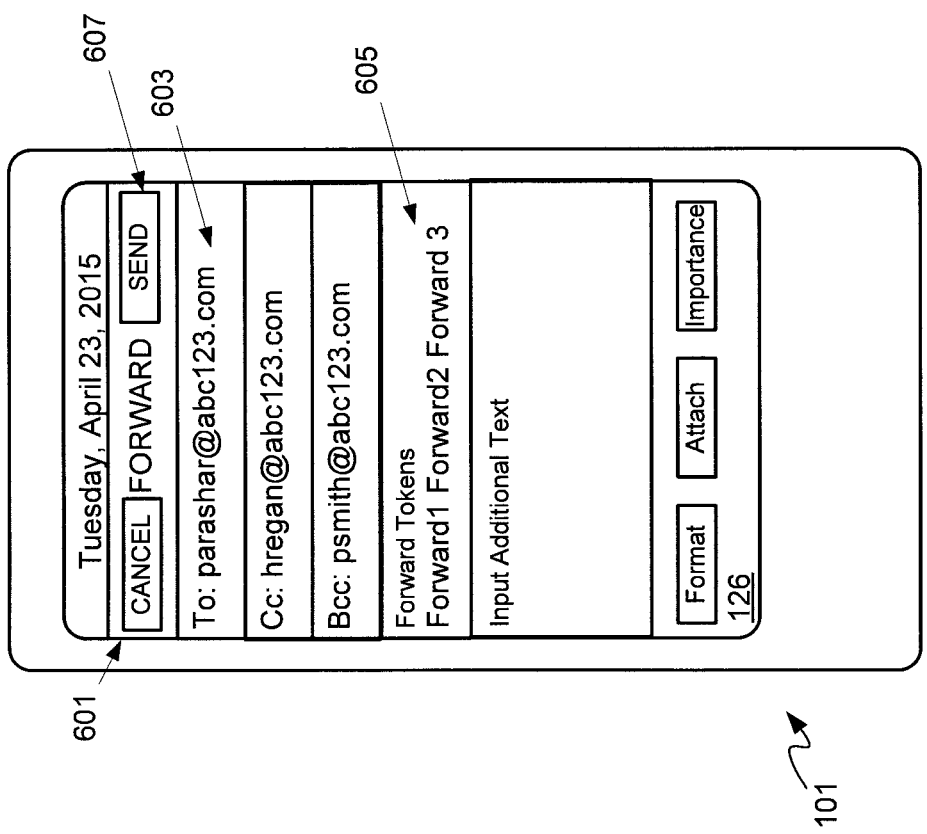
FIG. 6 depicts an optional intermediate forwarding message for receiving a given network address to which messages in a selection are to be forwarded, according to non-limiting implementations.

Attention is next directed to FIG. 6 which depicts, an intermediate forwarding message 601, rendered at display device 126 by processor 120, which can be generated after selection 405 is received and an indication of a single indication to forward all of the plurality of the messages 170 in selection 405 to a given network address is received; in the implementations, intermediate forwarding message 601 is used to receive the given network address; however, in other implementations, the given network address can be received in any other suitable manner, including GUIs that are not formatted as messages, including, but not limited to, text boxes and the like.

In any event, intermediate forwarding message 601 is generated in order to receive the given network address to which messages 170 in selection 405 are to be forwarded. As depicted, the given network address is received in an address field 603, for example from a keyboard and/or a virtual keyboard and/or as a selection from a contact list and/or as a selection from hotlist of network addresses and the like. It is assumed in the present example that the given network address received ("parashar123@abc123.com") is associated with device 107 such that messages are forwarded to device 107. While the given network address is depicted as an email address and/or an account identifier, in other implementations, the given network address can comprise a device identifier and/or an IP (internet protocol) address and the like; indeed, any type of network address that can be used to transmit messages to devices is within the scope of present implementations. Furthermore, while only one given network address is depicted in field 603, in other implementations more than one given network address can be received so that messages 170 in selection 405 are forwarded to each received given network address. Furthermore, as depicted, intermediate forwarding message 601 includes an optional cc: field and/or an optional bcc: field (e.g. respectively, "carbon copy" and "blind carbon copy") which can optionally include further given network addresses to which messages 170 in selection 405 can be forwarded. In some implementations, the one given network address is received in one of the optional cc: field or the optional bcc: field rather than field 603.

As depicted, intermediate forwarding message 601 further comprises a field 605 that is automatically populated with indications of forward tokens, for example "Forward1", "Forward2", "Forward3" each corresponding to one of messages 170 in selection 405. Field 605 can be provided in place of a subject field. Indeed, as depicted, intermediate forwarding message 601 is absent a subject field.

While not depicted, each forward token is associated with a respective one of messages 170 in selection 405, and acts as one or more of a placeholder and an instruction to forward a respective message. In particular, processor 120 associates a respective forward token with each of the plurality of distinct forwarding messages in a one-to-one relationship, the plurality of distinct forwarding messages described in more detail below.

The number of indications of forward tokens generally provides an indication of a number of messages to be forwarded. However, rather than render indications of forward tokens, processor 120 can be configured to provide other indications of messages to be forwarded. Indeed, intermediate forwarding message 60 can include an indication of one or more of: a plurality of distinct forwarding messages; a number of the plurality of distinct forwarding messages, and forward tokens for each of the plurality of distinct forwarding messages.

Intermediate forwarding message 601 further comprises various actuatable virtual buttons, including a button 607 that has the appearance of causing processor 120 to "send" intermediate forwarding message 601, as well as other buttons to provide message functionality. However, once button 607 is actuated, using touchscreen and/or input device 128, processor 120 discards intermediate forwarding message 601 in conjunction with transmitting the plurality of distinct forwarding messages. In other words, actuation of button 607 causes processor 120 to transmit a plurality of distinct forwarding messages corresponding to messages 170 in selection 405 and discard and/or delete and/or not send (and/or transmit) intermediate forwarding message 601.

Figure 7:
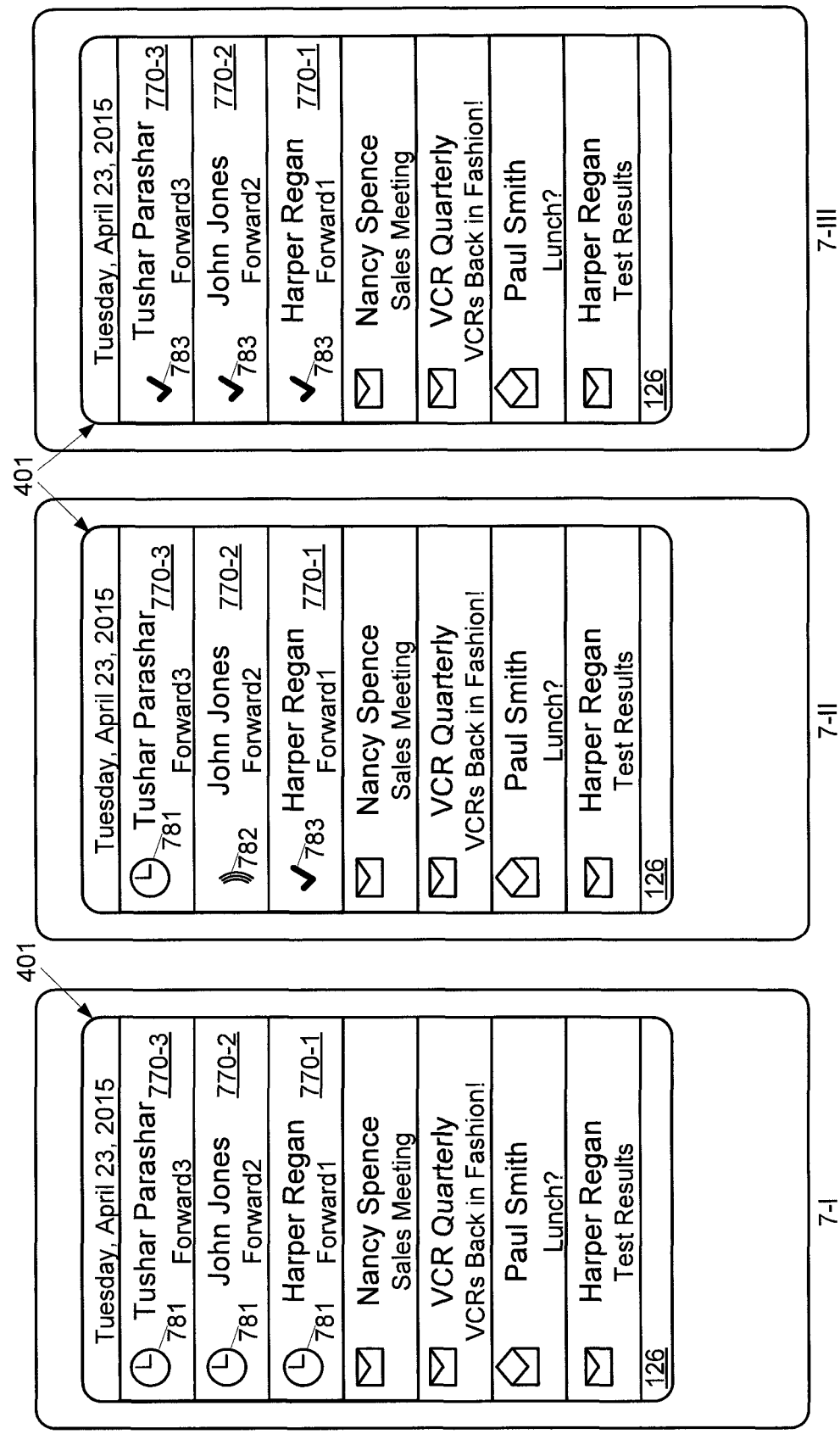
FIG. 7 depicts a sequence of view of the message list rendered at the device of FIG. 1, as messages selected in a group are forwarded independently, according to non-limiting implementations.

For example, attention is next directed to FIG. 7, which depicts a sequence of views 7-I, 7-II, 7-III of list 401 after button 607 is actuated. In particular a plurality of distinct forwarding messages 770-1, 770-2, 770-3 are generated in a one-to-one relationship with the plurality of messages 170 in selection 405. Messages 770-1, 770-2, 770-3, will be interchangeably referred to hereafter, collectively, as messages 770, and generically as a message 770.

For example, as three messages 170 are in selection 405, three distinct forwarding messages 770 are generated. As used herein, distinct forwarding messages can be understood as messages which are transmitted in a queue, but individually; in other words, each of messages 770 are not grouped together as attachments to a single message, but transmitted one-by-one in a queue.

Such distinct forwarding is further shown in FIG. 7; in particular, each of messages 770 is associated with a different field in list 401 indicating that each message 770 is distinct from another message 770.

In addition, each of messages 770 is associated with a different forwarding token, with first message 770-1 associated with a first forwarding token, second message 770-2 associated with a second forwarding token, and third message 770-3 associated with a third forwarding token. Hence, message 770-1 is transmitted first, message 770-2 is transmitted second and message 770-3 is transmitted third. In some implementations a next message 770 is not transmitted until a previous message 770 is transmitted. Hence, each message 770 is transmitted distinct from other messages 770 in a queue.

An associated forwarding token for each message 770 is indicated in each associated field. In general an indication of an associated forwarding token can be provided in place of a subject line. For example, comparing message 770-1 with an associated message in list 401, the subject line "Test Results" has been replaced with the text "Forward1". Processor 120 can use each forwarding token to track when an associated message is to be queued and/or transmitted.

An order of transmission of messages 770 and/or an order of forwarding tokens can be based on one or more of an order of selection of associated messages 170, an order of associated messages 170 in selection 405, a time of receipt of associated messages 170, and the like. Furthermore, while in FIG. 7 each message 770 is transmitted one after the other, in other implementations, other messages can be received between transmissions of messages 770 and/or other messages can be transmitted between transmission of messages 770, for example other messages having a higher priority than messages 770. In other words, a message queue that includes messages 770 can be modified by processor 120 to include messages that are not in selection 405.

Transmission of messages 770 is indicated in views 7-I, 7-II, 7-III using indications 781, 782, 783 associated with each message, with each indication 781, 782, 783 indicating a transmission state of an associated message 770 (e.g. an implementation of block 305 of method 300). As a transmission state of an associated message 770 changes, an indication changes. For example, indication 781 comprises an icon indicating that transmission of an associated message 770 is pending, indication 782 comprises an icon indicating that transmission of an associated message 770 is occurring, and indication 781 comprises an icon indicating that transmission of an associated message 770 has occurred.

Hence, as views 7-I, 7-II, 7-III are a sequence: in view 7-I, transmission of all messages 770 are pending; in view 7-II, transmission of message 770-1 has occurred, transmission of message 770-2 is occurring, and transmission of message 770-1 has occurred, transmission of message 770-3 is still pending; and in view 7-III, transmission of all messages 770 has occurred.

Hence, according to FIG. 7, processor 120 can be further configured to render, at display device 126, in a plurality of fields of message list 401, indications 781, 782, 783 of each the plurality of distinct forwarding messages 770 as the plurality of distinct forwarding messages 770 are being transmitted, each of the plurality of fields dedicated to a single respective distinct forwarding message 770 of the plurality of distinct forwarding messages 770. Furthermore, each of the plurality of fields further comprises a status of a respective distinct forwarding message 770; as depicted such status is indicated by indicators 781, 782, 783. In addition, processor 120 is further configured to independently change respective statuses of each of the plurality of distinct forwarding messages 770 in message list 401 as each of the respective statuses changes, as described above.

A format of each message 770 can be similar and/or the same as a corresponding message 170, however with a "To" field in each of messages 770 automatically populated with the given network address. When more than one given network address was received in intermediate forwarding message 601, the "To" field is populated with each given network address.

Hence, each message 770 is configured by processor 120 as separate out-going messages, independent of one another, each configured for transmission to the given network address and/or more than one given network address. Furthermore, when a message 170 has one or more indications of attachments and/or graphics, an associated message 770 can have similar indications of attachments and/or graphics. When a message 170 includes attachments and/or graphics, an associated message 770 include the attachments and/or graphics. Indeed, each message 170 can be identical to an associated message 170. Hence, each message 770 can comprise at least a portion of an associated message 170; for example, each message 770 can comprise text and metadata of an associated message 170 but not associated attachments and/or associated graphics, which can be replaced by respective indicators, as described above. However, in other implementations each message 770 can comprise an associated message 170 formatted, however, as an outgoing message to the given network address.

However, in other implementations, each message 770 can be modified by processor 120, for example based on data received at intermediate forwarding message 601; for example, attention is briefly directed back to FIG. 6 where it is apparent that intermediate forwarding message 601 includes buttons for setting a priority of messages 770 (the button labelled "Importance"), a button for adding attachments (the button labelled "Attach"), a button for changing a format of messages (the button labelled "Format"), as well as a field for receiving additional text; as such each of messages 770 can be modified by processor 120 to change a priority, include any additional attachments, changed to a format received on intermediate forwarding message 601 and/or have any additional text added to a beginning of a message 770. In other words, any options applied to intermediate forwarding message 601 can be applied to all of messages 170 in selection 405.

Figure 8:
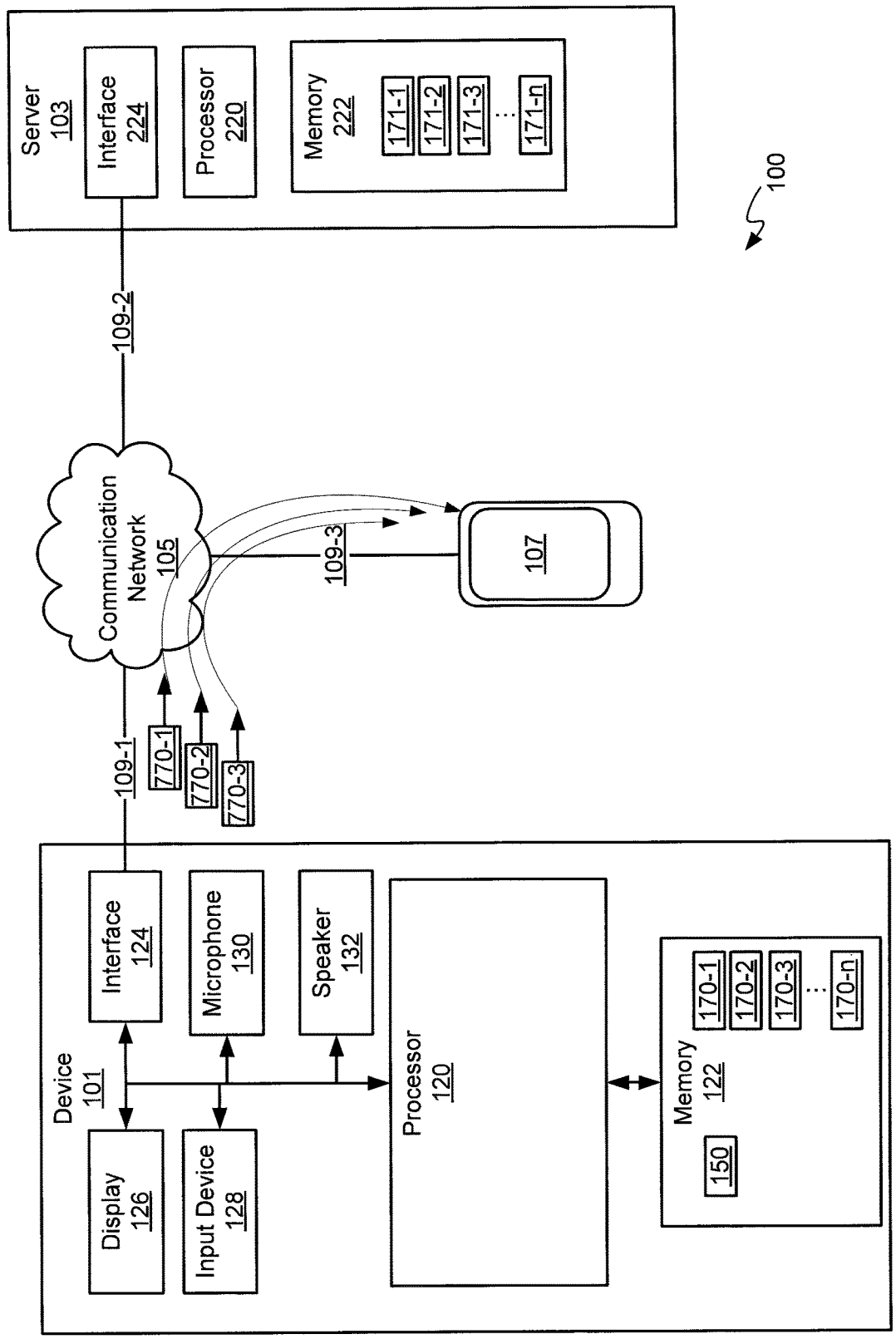
FIG. 8 depicts the system of FIG. 2, as messages selected in a group are forwarded independently, according to non-limiting implementations.

Attention is next directed to FIG. 8 which depicts transmission of messages 770 in system 100 (e.g. an implementation of block 305 of method 300). In particular, messages 770 are depicted as being transmitted one-by-one in a queue by device 101, independent of one another. In some implementations, messages 770 are transmitted to device 107 via links 109-1, 109-3 and network 105, bypassing server 103, and using the given address received in intermediate forwarding message 601, and the like. For example, while not depicted a "To" field in each of messages 770 can be automatically populated with the given network address, as described above. When more than one given network address was received in intermediate forwarding message 601 (e.g. in one or more of field 603, the cc: field and the bcc: field), the "To" field is populated with each given network address, and messages 770 are transmitted to each given network address.

Figure 9:
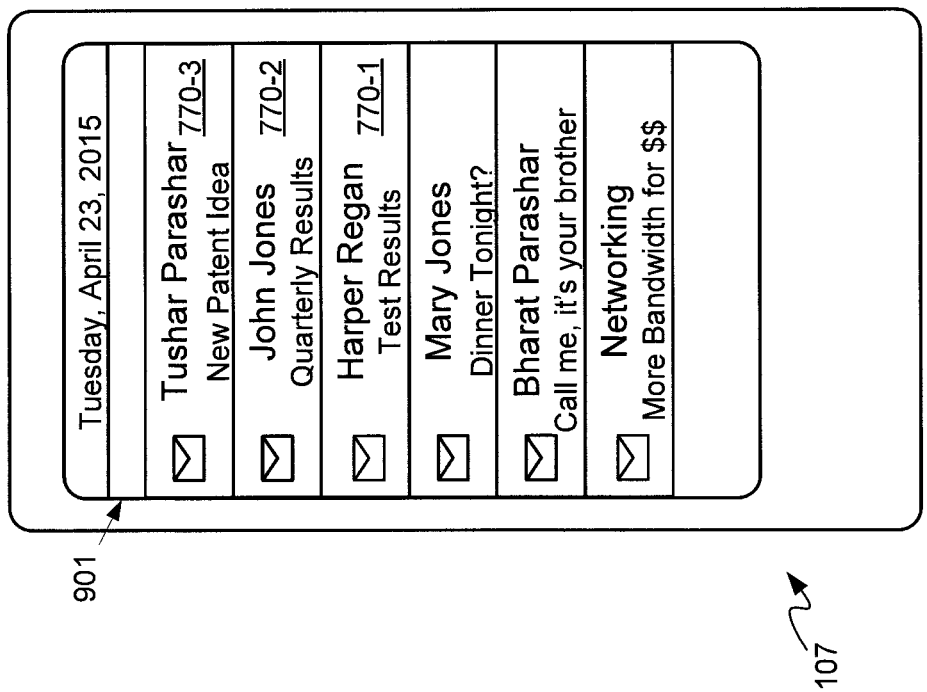
FIG. 9 depicts a message list rendered at a receiving device after forwarded messages are received, according to non-limiting implementations.

In these implementations, device 107 receives each message 770 one-by-one as they are conveyed independent of one another through network 105. Device 107 receives each of messages 770 and a processor at device 107 can render each message 770 in a message list 901 (similar to message list 401), as depicted in FIG. 9, which shows a front perspective view of a display device of device 107, and in particular a rendered message list 901. In particular list 901 comprises messages 770, however with a subject line of an associated message 170 provided rather than an indication of a forwarding token. Each message 770 is provided independently and/or distinct from other messages 770 in list 901, as in list 401 of messages 170. List 901 can further include other messages received from other devices and/or other messages from device 101 that were not forwarded using method 300. Furthermore, each message 770 can be stored individually in a memory of device 107, distinct from one another.

Figure 10:
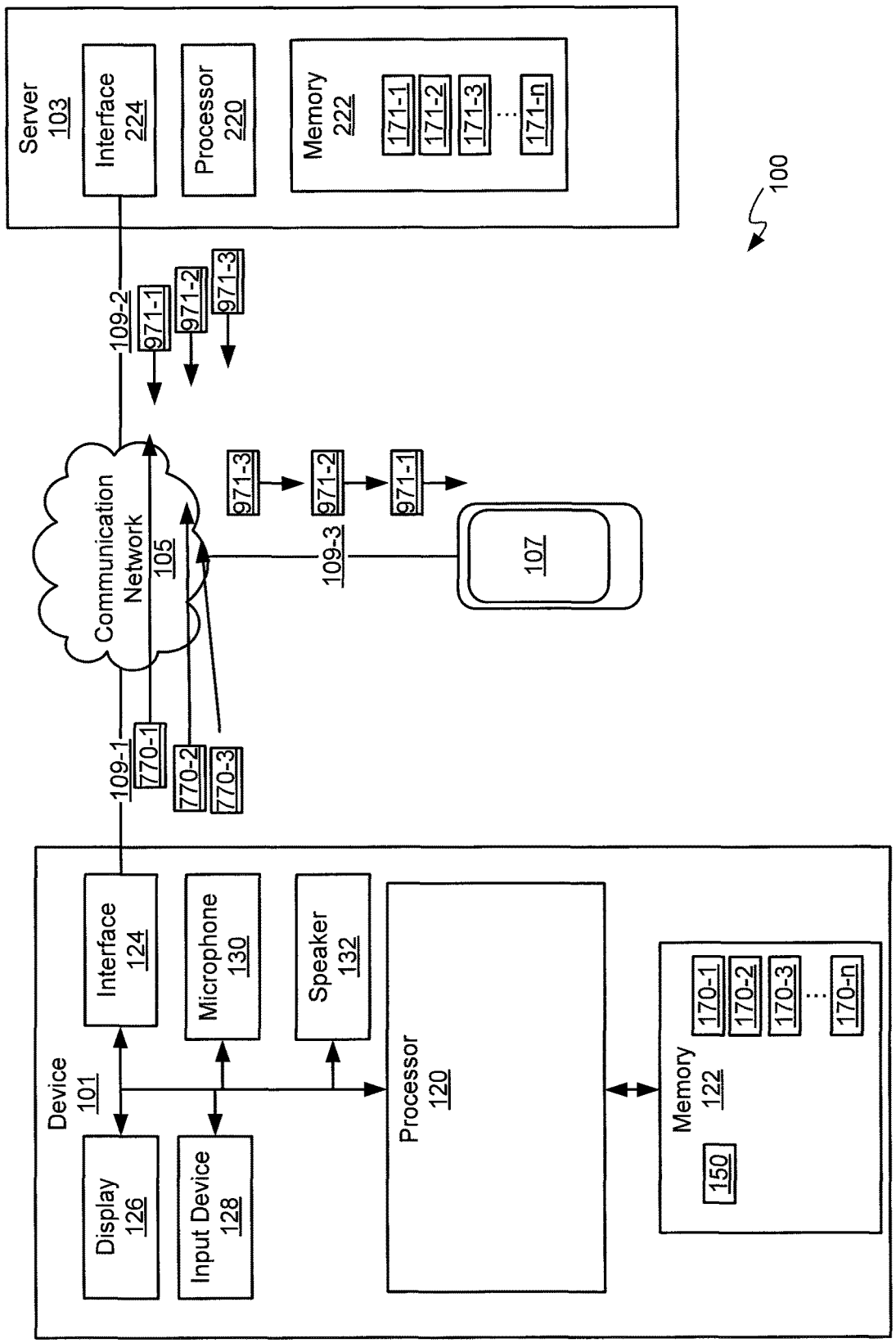
FIG. 10 depicts the system of FIG. 2, as messages selected in a group are forwarded independently, according to alternative non-limiting implementations.

In other implementations, as depicted in FIG. 10, device 101 can transmit messages 770 to server 103, along with the given network address received in intermediate forwarding message 601, and the like, using links 109-1, 109-2 and network 105 (e.g. another implementation of block 305 of method 300). For example, device 101 can be configured to transmit all messages to server 103 for handling. Each message 770 can be transmitted to server 103 with the given network address independently associated with each one of messages 770, as described above. Processor 220 can process each message 770 and retrieve an associated message 171 that corresponds to a message 170 from which a given message 770 was generated. Processor 220 can then generate a plurality of distinct forwarded messages 971-1, 971-2, 971-3 (interchangeably referred to hereafter, collectively, as messages 971, and generically as a message 971) from the associated messages 171. Messages 971 can include associated attachments stored at server 103 and/or be absent associated attachments, the associated attachments replaced by indicators for retrieving the attachments, as described above. Messages 971 can then be transmitted to device 107 via links 109-2, 109-3 and network 105.

For example, a plurality of messages 171 (corresponding to messages 170) are stored at server 103, the plurality of distinct forwarding messages 770 can be received at server 103 and each of the plurality of distinct forwarding messages 770 can be configured to cause server 103 to forward the plurality of messages 171 stored therein, corresponding to the plurality of distinct forwarding messages 770, to the given network address as a plurality of distinct forwarded messages 971. When more than one given network address is received, server 103 transmits messages 971 to each given network address.

Attachments and/or graphics to the plurality of messages 170 can be absent the plurality of distinct forwarding messages 971 when the plurality of messages 170 are stored at server 103; rather, the attachments and/or graphics can be retrieved from server 103 when requested by device 107.

As device 107 receives messages 971, device 107 can generate and/or update list 901 so list 901 appears as depicted in FIG. 9. Furthermore, each message 971 can be stored individually in a memory of device 107, distinct from one another.

Hence, described herein are a method, system and apparatus for distinct forwarding of a plurality of messages. Messages to be forwarded are selected as a group and then forwarded to a receiving device one-by-one, individually and/or distinct from one another. Such mass forwarding can be used in data migration of messages between devices so that distinct forwarded messages are received at a receiving device, for rendering in a list and/or individual storage, rather than as a group. However, processes described herein can also be used in day-to-day message forwarding.

Those skilled in the art will appreciate that in some implementations, the functionality of devices 101, 107 and server 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 107 and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:
1. A device comprising:
a processor, a memory, a communication interface, an input device and a display device, the processor configured to:
render, at the display device, a message list comprising messages associated with the device;

receive, using the input device, a selection of a plurality of the messages in the message list, and thereafter a single indication to forward all of the plurality of the messages in the selection to a given network address; and, in response to receipt of the single indication to forward all the plurality of the messages in the selection to the given network address:
generate a plurality of distinct forwarding messages, each respective distinct forward message of the plurality of distinct forwarding messages comprising at least a portion of one of the plurality of messages in the selection, the plurality of distinct forwarding messages having a one-to-one relationship with the plurality of messages in the selection, and
transmit, one-by-one in a queue, using the communication interface, each of the plurality of distinct forwarding messages to the given network address.

2. The device of claim 1, wherein the processor is further configured to render, at the display device, in a plurality of fields of the message list, indications of each the plurality of distinct forwarding messages as the plurality of distinct forwarding messages are being transmitted, each of the plurality of fields dedicated to a single respective distinct forwarding message of the plurality of distinct forwarding messages.

3. The device of claim 2, wherein each of the plurality of fields further comprises a status of a respective distinct forwarding message.

4. The device of claim 2, wherein the processor is further configured to independently change respective statuses of each of the plurality of distinct forwarding messages in the message list as each of the respective statuses changes.

5. The device of claim 1, wherein the processor is further configured to associate a respective forward token with each of the plurality of distinct forwarding messages in a one-to-one relationship.

6. The device of claim 1, wherein the processor is further configured to render, at the display device, an intermediate forwarding message, the given network address received in the intermediate forwarding message, the intermediate forwarding message discarded in conjunction with transmitting the plurality of distinct forwarding messages.

7. The device of claim 6, wherein the processor is further configured to include, in the intermediate forwarding message an indication of one or more of: the plurality of distinct forwarding messages; a number of the plurality of distinct forwarding messages; and forward tokens for each of the plurality of distinct forwarding messages.

8. The device of claim 6, wherein the intermediate forwarding message is absent a subject field.

9. The device of claim 1, wherein when a plurality of the messages are stored at a server, the plurality of distinct forwarding messages are transmitted to the server and each of the plurality of distinct forwarding messages are configured to cause the server to forward the plurality of the messages stored at server to the given network address as a plurality of distinct forwarded messages.

10. The device of claim 9, wherein attachments to the plurality of the messages are absent the plurality of distinct forwarding messages when the plurality of the messages are stored at the server.

11. A method comprising:
at a device comprising, a processor, a memory, a communication interface, an input device and a display device, render, at the display device, a message list comprising messages associated with the device;
receiving, using the input device, a selection of a plurality of the messages in the message list, and thereafter a single indication to forward all of the plurality of the messages in the selection to a given network address; and,
in response to receipt of the single indication to forward all the plurality of the messages in the selection to the given network address:
generating a plurality of distinct forwarding messages, each respective distinct forward message of the plurality of distinct forwarding messages comprising at least a portion of one of the plurality of messages in the selection, the plurality of distinct forwarding messages having a one-to-one relationship with the plurality of messages in the selection, and
transmitting one-by-one in a queue, using the communication interface, to the given network address, each of the plurality of distinct forwarding messages.

12. The method of claim 11, further comprising rendering, at the display device, in a plurality of fields of the message list, indications of each the plurality of distinct forwarding messages as the plurality of distinct forwarding messages are being transmitted, each of the plurality of fields dedicated to a single respective distinct forwarding message of the plurality of distinct forwarding messages.

13. The method of claim 12, wherein each of the plurality of fields further comprises a status of a respective distinct forwarding message.

14. The method of claim 12, further comprising independently changing respective statuses of each of the plurality of distinct forwarding messages in the message list as each of the respective statuses changes.

15. The method of claim 11, further comprising associating a respective forward token with each of the plurality of distinct forwarding messages in a one-to-one relationship.

16. The method of claim 11, further comprising rendering, at the display device, an intermediate forwarding message, the given network address received in the intermediate forwarding message, the intermediate forwarding message discarded in conjunction with transmitting the plurality of distinct forwarding messages.

17. The method of claim 16, further comprising including, in the intermediate forwarding message an indication of one or more of: the plurality of distinct forwarding messages; a number of the plurality of distinct forwarding messages; and forward tokens for each of the plurality of distinct forwarding messages.

18. The method of claim 11, wherein when a plurality of the messages are stored at a server, the plurality of distinct forwarding messages are transmitted to the server and each of the plurality of distinct forwarding messages are configured to cause the server to forward the plurality of the messages stored at server to the given network address as a plurality of distinct forwarded messages.

19. The method of claim 18, wherein attachments to the plurality of the messages are absent the plurality of distinct forwarding messages when the plurality of the messages are stored at the server.

20. A non-transitory computer-readable medium storing a computer program, wherein execution of the computer program is for:
at a device comprising, a processor, a memory, a communication interface, an input device and a display device, render, at the display device, a message list comprising messages associated with the device;

receiving, using the input device, a selection of a plurality of the messages in the message list, and thereafter a single indication to forward all of the plurality of the messages in the selection to a given network address; and, in response to receipt of the single indication to forward all the plurality of the messages in the selection to the given network address:

generating a plurality of distinct forwarding messages, each respective distinct forward message of the plurality of distinct forwarding messages comprising at least a portion of one of the plurality of messages in the selection, the plurality of distinct forwarding messages having a one-to-one relationship with the plurality of messages in the selection, and transmitting one-by-one in a queue, using the communication interface, to the given network address, each of the plurality of distinct forwarding messages.

\* \* \* \* \*